Nov. 18, 1924.

C. H. STOODY ET AL 1,516,471

APPARATUS FOR WELDING METAL

Filed Dec. 22, 1922

Inventors
Charles H. Stoody
Winston F. Stoody
Shelley M. Stoody
by Hazard and Miller
Attys Patented Nov. 18, 1924.

1,516,471

UNITED STATES PATENT OFFICE.

CHARLES H. STOODY, WINSTON F. STOODY, AND SHELLEY M. STOODY, OF WHITTIER, CALIFORNIA.

APPARATUS FOR WELDING METAL.

Application filed December 22, 1922. Serial No. 608,460.

*To all whom it may concern:*

Be it known that we, CHARLES H. STOODY, WINSTON F. STOODY, and SHELLEY M. STOODY, citizens of the United States, residing at Whittier, in the county of Los Angeles and State of California, have invented new and useful Improvements in Apparatus for Welding Metal, of which the following is a specification.

Our invention relates to a process of and apparatus for welding, and the purpose of our invention is the provision of a process of and apparatus for the welding of cutting edges to cutting implements of various characters so that cutting implements having worn and dull cutting edges can be restored for further use.

It is also a purpose of our invention to provide a process of and apparatus for the welding of new cutting edges to worn and discarded disc drills used in rotary well drilling apparatus, and whereby the necessity of discarding such disc drills as is now the practice and the attended expense, is eliminated.

A further purpose of our invention resides in the provision of a welding process and apparatus in which the disc drill supporting table is continually cooled to prevent annealing of the body of the disc, and at the same time to properly temper the cutting edge so that it will have the required degree of hardness.

Although we have herein shown and described only one process and one form of apparatus embodying our invention, it is to be understood that various changes and modifications may be made herein without departing from the spirit of the invention and the spirit and scope of the subjoined claims.

Figure 1:
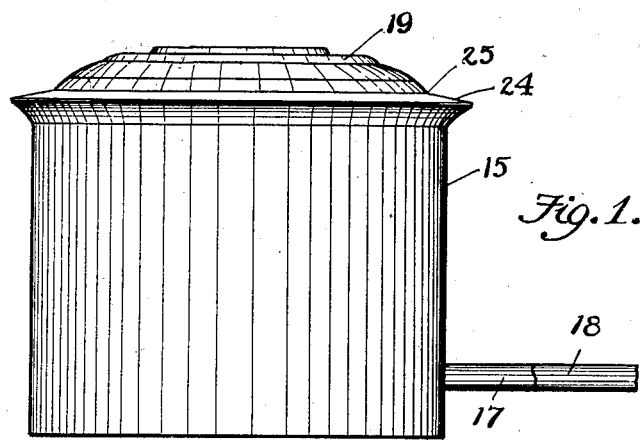
Figure 3:
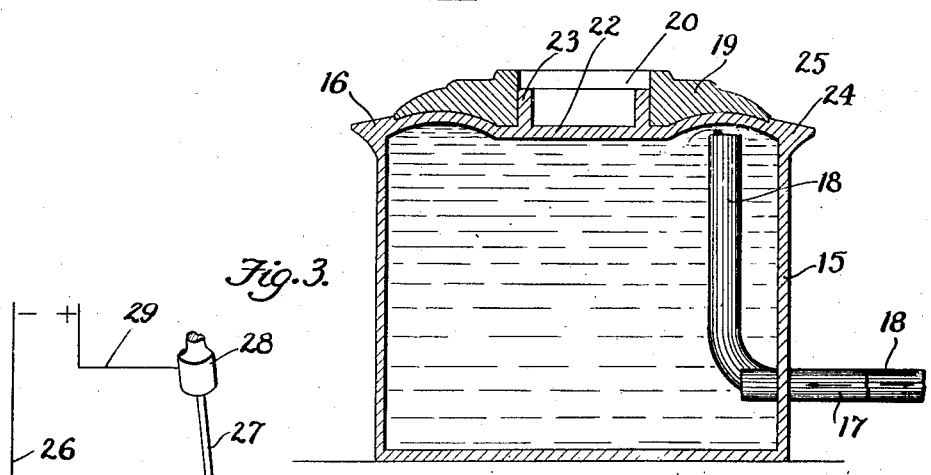
Figure 2:
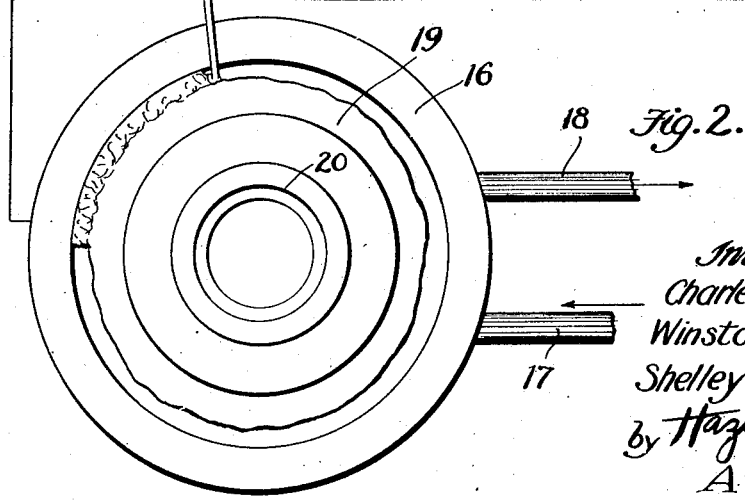

In the accompanying drawings,

Figure 1 is a view showing in side elevation one form of welding apparatus embodying our invention, Figure 2 is a top plan view of the apparatus shown in Figure 1, Figure 3 is a vertical sectional view.

Referring specifically to the drawing in which similar reference characters refer to similar parts, our invention, in its present embodiment, comprises a tank 15 formed of suitable metal and including a head 16 constructed of conducting material such as copper and the like which constitutes a table for the supporting of the article to be welded. For the purpose of continually cooling the table, for reasons to be hereinafter explained, water or any other cooling medium is supplied to the tank by means of an inlet pipe 17 and an outlet pipe 18, the latter having its inlet end disposed adjacent the top of the tank, as shown in Figure 3, for the purpose of conducting the heated water from the tank, as will be understood. Means (not shown) is provided for constantly supplying cooled water to the tank through the inlet pipe 17.

As clearly shown in Figure 3, the table 16 is adapted to support the article to be welded, and the article in the present embodiment of our invention, is a disc drill used in rotary well drilling apparatus. The disc drill designated at 19 is formed with an axial opening 20, while one side of the body of the disc is convex and the other side concave. In order to properly support the disc drill during the welding operation, the table 16 is constructed to conform to the concave side of the disc drill, and to this end the table is formed with a convex portion 21 disposed concentrically of a flat portion 22. Extending upwardly from the portion 22 is an annular collar 23 of a diameter to be received within the opening 20 of the disc drill, and to thereby serve as a centering medium for the drill so that its edges will be disposed concentric with respect to the table. Encircling the convex portion 21 is an annular flange 24, the upper surface of which is disposed above the outer edge of the convex portion so as to provide an annular shoulder 25 at the junction of the two. This shoulder is adapted to define the cutting edge of the disc drill during the welding operation, as will be more fully described hereinafter.

The tank 15 is formed of conducting material, and the head 16 is preferably formed of copper, the two being adapted to cooperate with the disc drill when the latter is in applied position upon the table to form one of the electrodes of the electrical welding apparatus. In the present instance, we have shown the tank and table as constituting the negative electrode of the apparatus, with a conductor 26 extending from the tank, as shown in Figure 2. The positive electrode of the apparatus is in the form of a stick or rod 27 preferably of manganese steel and is adapted to be supported in a suitable bracket 28, to which latter is connected the positive conductor 29. It will be understood that the conductors 26 and 29 are adapted to be connected to a suitable source of current (not shown) for supplying current of a constant potential to the two electrodes.

In practice, water or any other suitable cooling medium is constantly circulated into and out of the tank 15 through the pipe 17 and 18. A disc drill which has lost its cutting edge through continued use, is now placed upon the table 16 in the manner shown in Figure 3 so that by applying the electrode 27 in arcing position with respect to its edge, a welding arc is generated between the disc and electrode in the manner well understood by those skilled in the art, thereby causing a melting of the electrode 27 and depositing of the steel upon the edge of the disc. Consequently, as the electrode 27 is moved circumferentially of the disc as indicated by the arrow in Figure 2, the electrode will continue to melt and deposit the molten steel upon the edge of the disc and to thus restore the disc to its original diameter and to provide a new cutting edge.

By virtue of the shoulder 25, the molten metal deposited upon the edge of the disc will be limited in its spreading movement to the original diameter of the disc so that at the completion of the welding operation, the metal added will restore the normal diameter of the disc.

It will thus be manifest that with the disc restored to its normal diameter, subsequent grinding along the edge of the disc will restore its cutting edge and thus produce a practically new disc drill from one which was worn and useless.

During the welding operation, the cooling medium within the tank 15 naturally maintains the table 16 at a relatively low temperature so that as the molten metal from the electrode 27 is deposited upon the drill, it will be rapidly chilled, thereby tempering the metal to the required degree of hardness to provide an efficient cutting edge for the drill. Similarly, the body of the disc drill is maintained at a low temperature through its intimate association with the table 16 so that in spite of intense heat set up by the welding arc, annealing of the drill body is positively prevented.

We claim as our invention:

1. An electric welding apparatus comprising a tank electrode upon which the article to be welded is supported, a second electrode formed of metal and adapted for arcing engagement with the article to deposit molten metal upon the article, means formed on the first electrode for limiting the spreading of molten metal, and upstanding means formed on the first electrode for centering the article thereon for the purpose described.

2. An electric welding apparatus comprising a water tank having a top forming a table constituting one electrode and upon which a worn casting is adapted to be supported, an annular shoulder formed on the table top for defining one original dimension of the casting, and a portable metal electrode adapted for arcing association with the casting to furnish molten metal for the casting, said means limiting the spreading of the molten metal to one original dimension of the casting for the purpose described.

3. In a disc rebuilding apparatus, comprising a table adapted to position a rotary disc to be repaired, means for chilling the molten metal to be deposited on the edge of the disc, said table having a shoulder to define the rebuilt edge of the disc.

4. In a disc rebuilding apparatus a chill tank having a table, a centering and retaining wall formed on the top of the table, and an annular shoulder disposed concentrically with respect to the wall, for the purpose described.

5. In a disc rebuilding apparatus, a chill tank having a table, a centering wall on the table, and a rim formed on the table for defining one original dimension of a casting adapted to be supported on the table.

6. In a disc rebuilding apparatus, a chill tank having a table, a disc bore fitting member on the table, the latter formed with a top recess for defining one original dimension of a disc adapted to be supported on the table and about said member, and means for maintaining the tank table at a relatively low temperature.

7. In a welding apparatus, a tank having a table having an annular convex portion, a centering projection disposed axially of the convex portion, and an annular flange disposed concentrically of the convex portion and formed to provide a shoulder at the junction of the two for the purpose described, the table being of concavo-convex form.

In testimony whereof we have signed our names to this specification.

C. H. STOODY.
W. F. STOODY.
S. M. STOODY.